UNITED STATES PATENT OFFICE.

HERBERT LEVINSTEIN, OF MANCHESTER, ENGLAND.

PRODUCTION OF AZO DYESTUFFS.

1,283,231. Specification of Letters Patent. Patented Oct. 29, 1918.

No Drawing. Application filed February 14, 1916. Serial No. 78,275.

*To all whom it may concern:*

Be it known that I, HERBERT LEVINSTEIN, a subject of the King of Great Britain and Ireland, and a resident of Manchester, in the county of Lancaster, England, have invented new and useful Improvements in the Production of Azo Dyestuffs, of which the following is a specification.

This invention relates to the production of valuable, fast, blue mordant azo dyestuffs having the following general constitution:

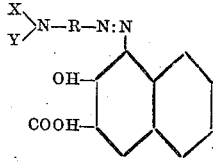

in which X can be hydrogen or an alkyl group, Y also may be hydrogen or an alkyl group, and R a benzene residue.

The new dyestuffs are of great value because of their fastness and because of the beautiful shades produced by them, which are brighter than those hitherto produced by azo mordant dyestuffs.

They may be applied to wool by the one bath method, or they may be dyed on wool or on cotton previously mordanted with chrome.

Various shades of blue may be produced by substituting one or more hydrogen atoms in the benzene ring in the above formula, by suitable substitution groups, such as for instance halogen, alkoxy, sulfo, or alkyl groups.

The following will sufficiently serve as an example of the manner in which this invention may be carried into effect, but I do not bind myself to the exact proportions and temperatures given, which may be varied within limits.

153 parts of paraamidoacetanilid are diazotized in the known way and the diazo solution is then combined with an alkaline solution containing 200 parts of betaoxynaphthoic acid, melting at 216° C.

The dyestuff is separated by filtration and then hydrolyzed by heating to 90° C. with a 5 per cent. solution of caustic soda. When hydrolysis is completed the caustic soda is neutralized and the dyestuff is isolated in the known way.

When dyed on chrome mordanted wool with the addition of a little acid, for instance, bright, level, blue shades of great fastness are obtained.

Having now particularly described and ascertained the nature of my said invention and in what manner the same is to be performed, I declare that what I claim is:—

Fast blue mordant mono azo dyestuffs having the general constitution

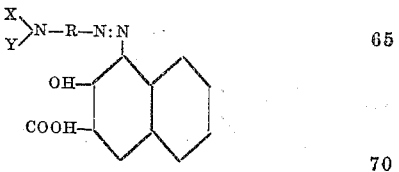

in which R is a benzene residue, X is hydrogen or an alkyl group, Y is hydrogen or an alkyl group, and in which one or more of the hydrogen atoms in the benzene ring may be replaced by a substituent, substantially as described.

In witness whereof I have hereunto set my hand.

HERBERT LEVINSTEIN.